(12) United States Patent
Foran et al.

(10) Patent No.: US 12,304,184 B2
(45) Date of Patent: May 20, 2025

(54) COMPOSITE MATERIAL VEHICLE CARGO COMPARTMENT CONSTRUCT

(71) Applicant: Teijin Automotive Technologies, Inc., Auburn Hills, MI (US)

(72) Inventors: Hugh C. Foran, Auburn Hills, MI (US); Eric J. Haiss, Auburn Hills, MI (US); Matthew Plauman, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 396 days.

(21) Appl. No.: 17/792,235

(22) PCT Filed: Jan. 15, 2021

(86) PCT No.: PCT/US2021/013573
§ 371 (c)(1),
(2) Date: Jul. 12, 2022

(87) PCT Pub. No.: WO2021/146518
PCT Pub. Date: Jul. 22, 2021

(65) Prior Publication Data
US 2023/0046294 A1    Feb. 16, 2023

Related U.S. Application Data

(60) Provisional application No. 62/961,275, filed on Jan. 15, 2020.

(51) Int. Cl.
*B32B 27/12*    (2006.01)
*B32B 3/12*    (2006.01)
(Continued)

(52) U.S. Cl.
CPC ............ *B32B 27/12* (2013.01); *B32B 3/12* (2013.01); *B32B 7/027* (2019.01); *B32B 7/12* (2013.01);
(Continued)

(58) Field of Classification Search
CPC .................................................... B60R 13/01
(Continued)

(56) References Cited

U.S. PATENT DOCUMENTS 6,176,537 B1   1/2001  Doshi
7,353,960 B2 *  4/2008  Seiter .................. B61D 17/18
                                                220/1.5
(Continued)

FOREIGN PATENT DOCUMENTS

DE        10347598 A1   6/2005
EP         2363277 A1   9/2011
(Continued)

OTHER PUBLICATIONS

Supplementary European Search Report issued in corresponding European Patent Appln. No. 21741737, dated Jan. 17, 2024.
Int'l Search Report for PCT/US2021/013573, dated May 4, 2021.

*Primary Examiner* — Joseph D. Pape
(74) *Attorney, Agent, or Firm* — MaxGoLaw PLLC

(57) ABSTRACT

A vehicle cargo construct includes a floor, a plurality of side wall panels extending from the floor, and an end wall panel extending from the floor between the plurality of side wall panels. The floor has an upper surface and an oppositely opposed lower surface. Each of the plurality of side wall panels has an exterior surface and an oppositely opposed interior surface. The end wall panel has an exterior surface and an oppositely opposed interior surface. Each of the floor, the plurality of side wall panels, and the end wall panel being formed of a composite sandwich panel material formed of an
(Continued)

open area core defining a plurality of pores, a surface sheet adhered to a first face of the open area core by a first adhesive layer, and a structural skin adhered to a second face of the open area core by a second adhesive layer.

19 Claims, 8 Drawing Sheets

(51) Int. Cl.
  *B32B 7/027*   (2019.01)
  *B32B 7/12*   (2006.01)
  *B60R 13/01*   (2006.01)

(52) U.S. Cl.
  CPC .......... *B60R 13/01* (2013.01); *B32B 2250/03* (2013.01); *B32B 2260/02* (2013.01); *B32B 2305/026* (2013.01); *B32B 2305/18* (2013.01); *B32B 2305/30* (2013.01); *B32B 2307/102* (2013.01); *B32B 2307/3065* (2013.01); *B32B 2307/406* (2013.01); *B32B 2307/7265* (2013.01); *B32B 2398/00* (2013.01); *B32B 2605/003* (2013.01)

(58) Field of Classification Search
  USPC ........................................................ 296/39.2
  See application file for complete search history.

(56) References Cited

U.S. PATENT DOCUMENTS

| | | | |
|---|---|---|---|
| 8,070,994 B2* | 12/2011 | Carlson | ................ B29C 44/186 |
| | | | 264/46.7 |
| 2005/0042432 A1 | 2/2005 | Jones et al. | |
| 2008/0174149 A1 | 7/2008 | Simms et al. | |
| 2014/0130657 A1 | 5/2014 | Pilpel et al. | |
| 2015/0130105 A1 | 5/2015 | Preisler et al. | |
| 2018/0170449 A1* | 6/2018 | Cox | ................... B62D 25/2054 |

FOREIGN PATENT DOCUMENTS

| | | |
|---|---|---|
| JP | 2001097249 A | 4/2001 |
| WO | 2015164353 A1 | 10/2015 |

* cited by examiner (PRIOT ART)

(PRIOT ART)

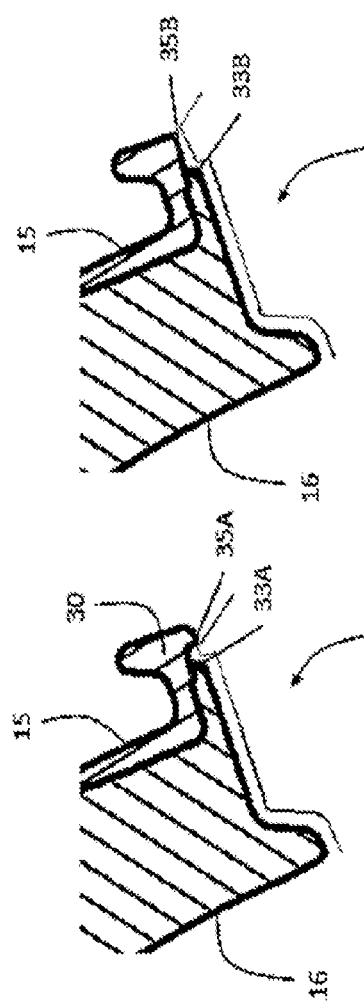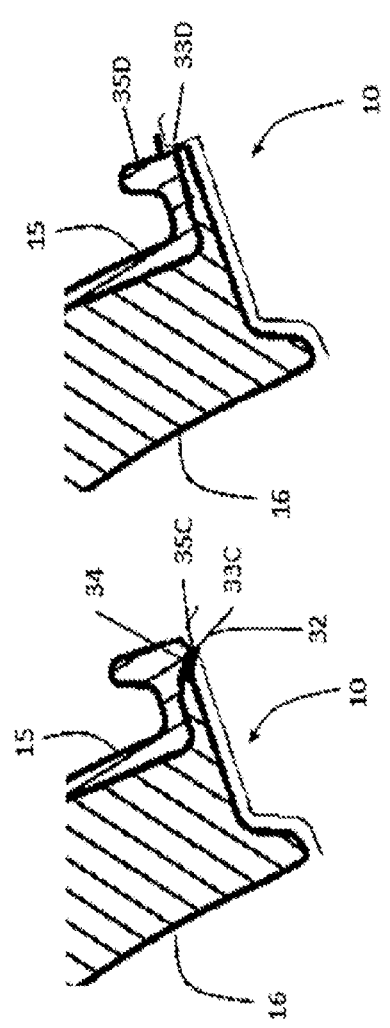
FIG. 6A  FIG. 6C
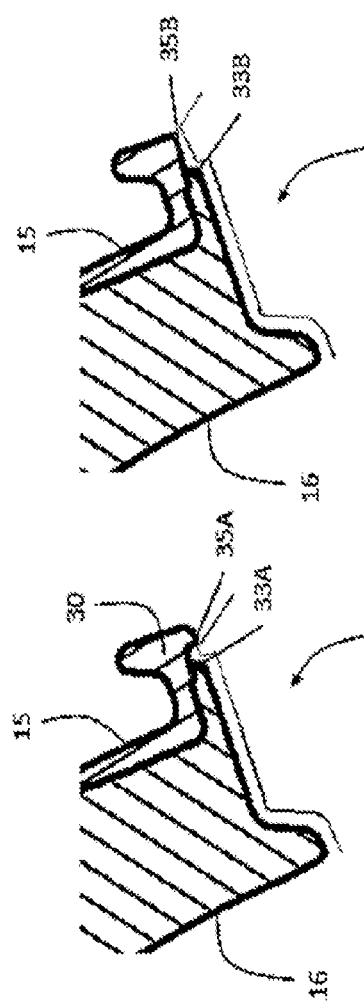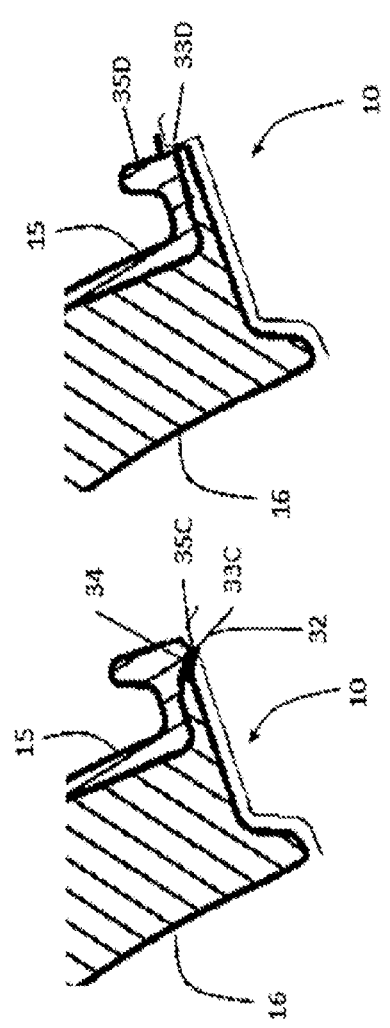
FIG. 6B  FIG. 6D

COMPOSITE MATERIAL VEHICLE CARGO COMPARTMENT CONSTRUCT

CROSS-REFERENCE TO RELATED APPLICATION

This application claims priority of U.S. Provisional Patent Application Ser. No. 62/961,275 filed Jan. 15, 2020, which is incorporated herein by reference.

FIELD OF THE INVENTION

The present invention in general relates to composite materials and in particular to a vehicle cargo bed and pickup truck box formed with a composite open area core sandwich structure.

BACKGROUND OF THE INVENTION

Lightweight and heavy duty trucks, such as pickups and sport utility vehicle have become increasingly popular for both business and personnel use. These vehicles are typically equipped with features and accessories to store and transport cargo, such as a generally horizontal truck bed and generally vertically oriented walls extending therefrom that together define a cargo compartment. As shown in FIG. 1, typical truck beds and walls defining cargo compartments 100 are integrally formed as part of the vehicle body 102, which is then fastened to the vehicle frame 104. Alternatively, as shown in FIG. 2, some typical truck beds and walls defining cargo compartments 100 are integrally formed with the vehicle frame 104 structure, separate from the body of the cab portion 106 of the vehicle. In both cases, typical truck beds and walls defining cargo compartments are formed of steel, in order to withstand the typical wear and tear exerted upon truck beds and walls defining cargo compartments.

Weight savings in the automotive, transportation, and logistics based industries has been a major focus in order to make more fuel efficient vehicles. In order to reduce the weight of components associated with truck beds and walls defining cargo compartments, attempts have been made to form truck beds and walls defining cargo compartments out of aluminum; however, such truck beds and walls defining cargo compartments are easily punctured by objects placed in the cargo compartments during ordinary use. To avoid such punctures, other scratches, or damage to the truck bed and walls defining cargo compartments resulting from usual pickup truck use, users typically install a robust polymeric liner within the cargo compartment to cover the steel or aluminum truck bed and walls defining cargo compartments. Such truck bed liners are an added expense to consumers, add to the weight of the vehicle, and reduce the usable space available within the cargo compartment.

In order to achieve weight savings in other areas of vehicles, light weight composite materials have been introduced to take the place of typical metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials.

A sandwich-structured composite is a special class of composite material that is fabricated by attaching two thin but stiff skins to a lightweight but thick core. The core material is normally a low strength material, but its higher thickness provides the sandwich composite with high bending stiffness with overall low density. While sandwich structures have previously been developed to provide strength and reduced weight, the ability to obtain a vehicle exterior quality high gloss surface has remained a challenge, regardless of whether the surface outermost layer is thermoset resin or thermoplastic. Exemplary of these efforts are U.S. Pat. Nos. 5,087,500A; 4,803,108A; 8,091,286B2; 4,369,608A; 3,553,054A; and WO2018/202473. It is conventional to either not use such structures in settings where vehicle high surface gloss are required, for example, truck beds and walls defining cargo compartments, or resort to an additional outer layer to provide a high gloss outermost layer. Such outermost layers can be applied after structure production or through in mold coatings, both of which add to the cost and complexity of production.

Still another conventional problem with sandwich structures is that the edges are ineffective and allow for infiltration of humidity or moisture that becomes entrained within the core and often inconsistent with finished vehicle surface requirements. With temperature extremes this entrained moisture can reduce the operational lifetime of the structure, while increasing the weight thereof. These problems of moisture infiltration are particularly pronounced in instances when the core is formed of cellulosic materials such as paper. Accordingly, such composite structures have been unsuitable for forming truck beds and walls defining cargo compartments given that such areas of a vehicle are openly exposed to the elements.

Thus, there exists a need for a light weight yet robust truck bed and walls defining cargo compartments capable of withstanding typical wear and tear and environmental elements experienced by truck cargo compartments.

SUMMARY

The present invention provides a vehicle cargo construct that includes a floor, a plurality of side wall panels extending from the floor, and an end wall panel extending from the floor between the plurality of side wall panels. The floor has an upper surface and an oppositely opposed lower surface. Each of the plurality of side wall panels has an exterior surface and an oppositely opposed interior surface. The end wall panel has an exterior surface and an oppositely opposed interior surface. Each of the floor, the plurality of side wall panels, and the end wall panel being formed of a composite sandwich panel material formed of an open area core defining a plurality of pores, a surface sheet adhered to a first face of the open area core by a first adhesive layer, and a structural skin adhered to a second face of the open area core by a second adhesive layer.

BRIEF DESCRIPTION OF THE DRAWINGS

The present invention is further detailed with respect to the following drawings that are intended to show certain aspects of the present invention but should not be construed as a limit on the practice of the present invention.

FIGS. 6A-6D are cross-sectional views of edges of a composite sandwich panel material;

DESCRIPTION OF THE INVENTION

Figure 1:
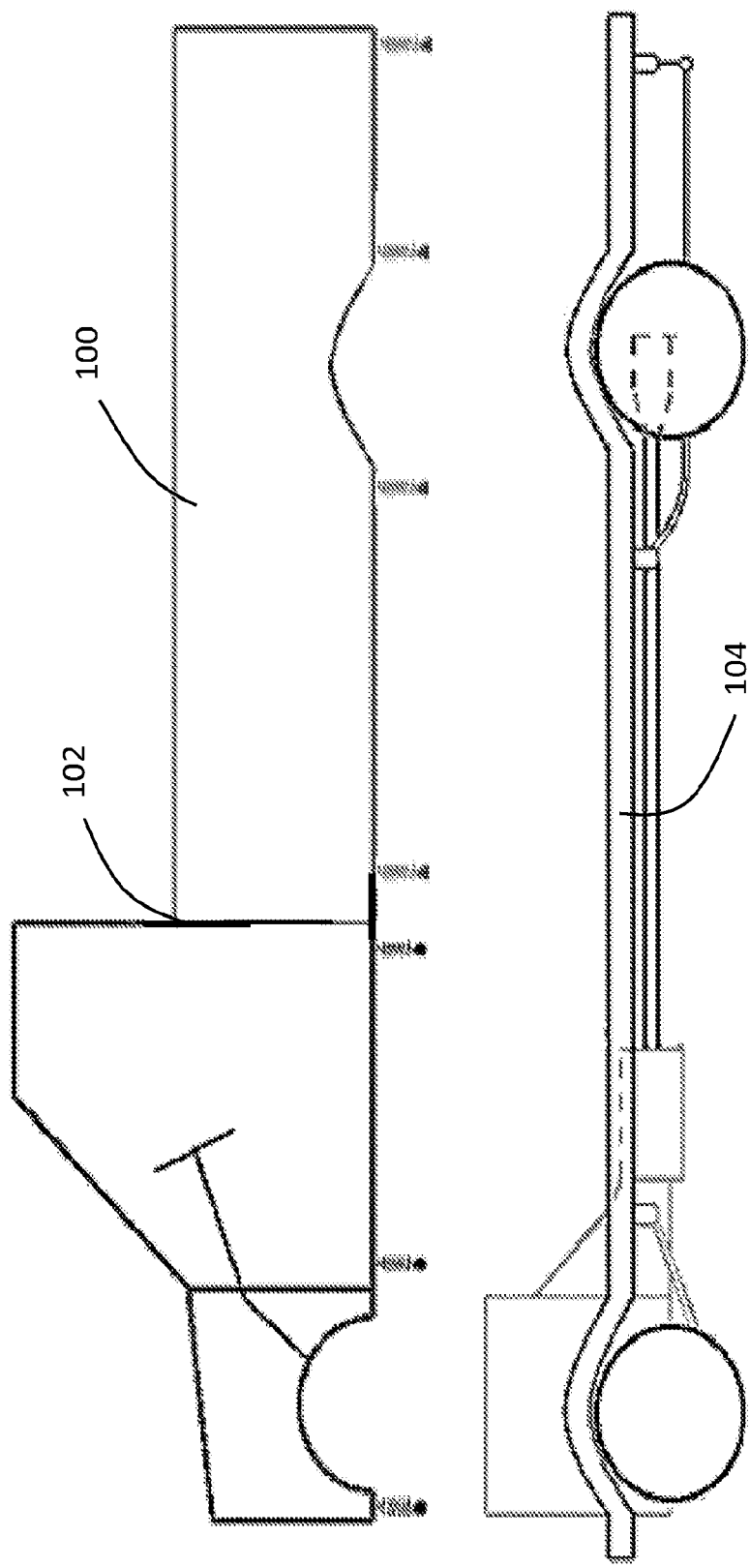
FIG. 1 is a schematic drawing showing a side view of a typical pickup truck in which the cargo compartment is integrally formed with the vehicle body.
Figure 2:
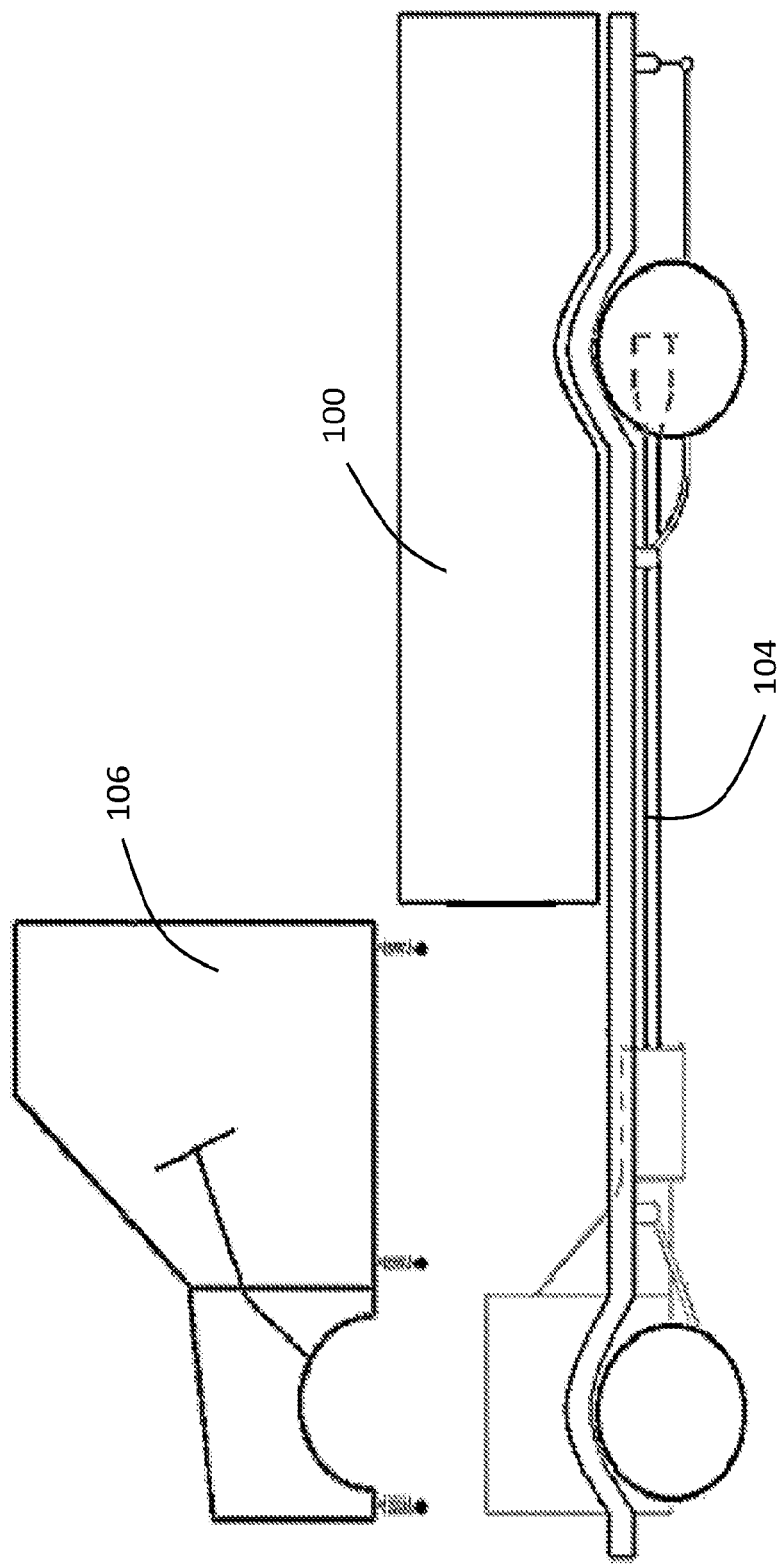
FIG. 2 is a schematic drawing showing a side view of a typical pickup truck in which the cargo compartment is integrally formed with the vehicle frame.

The present invention has utility as a light weight yet robust vehicle cargo bed and pickup truck box formed with a composite open area core sandwich structure capable of withstanding typical wear and tear and environmental elements experienced by truck cargo compartments. The use of the composite sandwich structure allows for replacement of traditional materials such as steel or aluminum, without a loss of strength, in a vehicle's cargo bed or pickup truck box while also reducing the overall weight of the vehicle. Additionally, the present invention has utility as components for forming a cargo bed or pickup truck box structure having a high gloss surface suitable for the vehicle exterior and having an opposite robust surface suitable for lining a truck cargo compartment, while being a high strength and light weight vehicle component.

According to embodiments, components for forming a cargo bed or pickup truck box structure are formed of a sandwich composite structure as detailed in U.S. Provisional Patent Application No. 62/774,600, filed on Dec. 3, 2018, the contents of which are hereby incorporated by reference. As described therein, embodiments of the sandwich composite structure provide a high gloss surface sheet and structural skin that are adhered to the open area core with an adhesive or glue that is viscous when applied. The viscosity of the adhesive as applied allows for contact with the interior volume of the open area core to create more adhesion surface area yet without excessively running into the pores defined in the open area core before the adhesive cured or hardens thereby providing greater adhered contact area between the components of the sandwich composite structure. As a result, reduced delamination of the components of the sandwich composite structure is observed as well as precluding bond line readthrough into the high gloss surface sheet. It is appreciated that providing a high gloss exterior surface without resort to an additional outmost layer requires a balancing of opposing surface tension properties of the composite sandwich panel structures to avoid a loss in tolerances associated with bowing of the structure. Thus, forming components for forming a cargo bed or pickup truck box structure out of such a composite sandwich structure Embodiments of the present invention also have utility as watertight and waterproof composite sandwich panel structures.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

As used herein, the term "high gloss surface" refers to a surface having minimal perceptible surface defects when visually inspected for about three seconds from about 24-28 inches from the viewer and normal to the part surface +/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss, yet must retain dimensionality and adhesion uniformity to primer and paint so as to achieve a high gloss finish.

Figure 3:
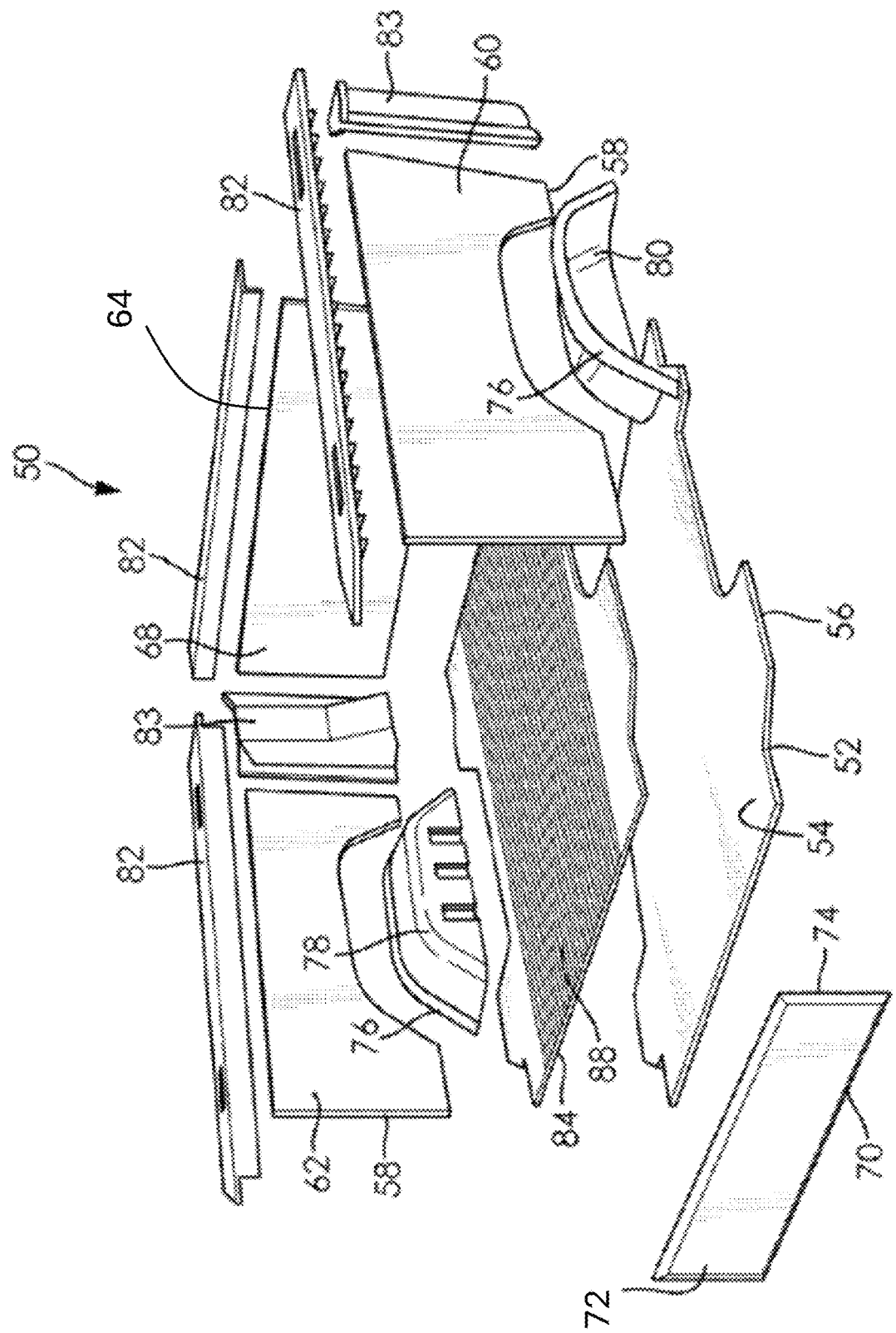
FIG. 3 shows an exploded perspective view of an inventive vehicle cargo construct according to embodiments of the present invention.

FIG. 3 shows an exploded perspective view of an inventive vehicle cargo construct 50 according to embodiments of the present invention. According to embodiments, the vehicle cargo construct 50 includes a floor 52, a plurality of side wall panels 58 extending from said floor 52, and an end wall panel extending 64 from said floor 52 between the side wall panels 58. The floor 52 has an upper surface 54 and an oppositely opposed lower surface 56. Each of the side wall panels 58 has an exterior surface 60 and an oppositely opposed interior surface 62. The end wall panel 64 has an exterior surface 66 and an oppositely opposed interior surface 68. According to embodiments, the floor 52, the side wall panels 58, and the end wall panel 64 are formed of a composite sandwich panel material 10, such as that shown in FIGS. 4-7. The composite sandwich panel material 10 includes an open area core 12 with walls 26 defining an ordered array of pores 24 terminating in faces 17 and 17', a surface sheet 14 adhered to a first face 17 of the open area core 12 by a first adhesive layer 20, and a structural skin 16 adhered to a second face 17' of the open area core 12 by a second adhesive layer 22.

Figure 4:
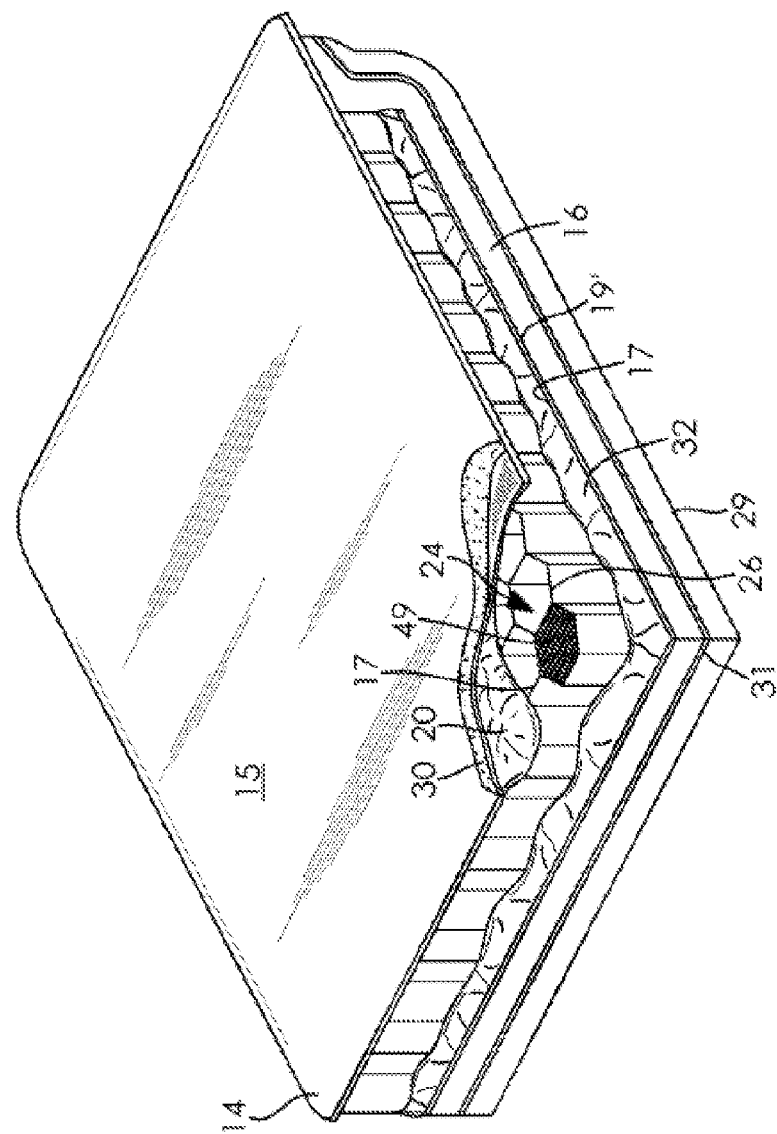
FIG. 4 is a partial cutaway, perspective view of a composite sandwich panel material used to form embodiments of the inventive cargo construct.
Figure 5:
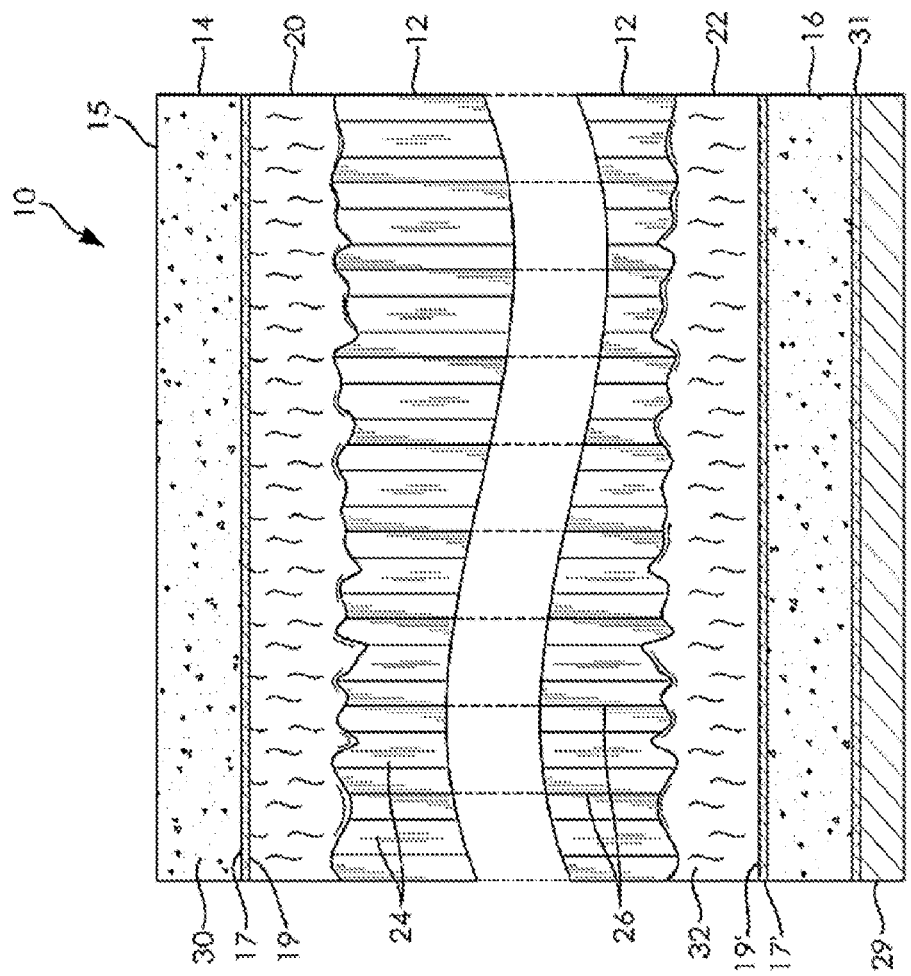
FIG. 5 is an enlarged partial cutaway, side view of the composite sandwich panel material of FIG. 4 along a line bisecting the hexagonal pores.

As shown in FIG. 4, a portion of the surface sheet 14 is cutaway to reveal the adhesive 20, a cloth, if present; and the open area core 12. The surface sheet 14 is adhered to a first side of the open area core 12 by a first adhesive layer 20. According to embodiments, the surface sheet 14 presents an outwardly facing high gloss surface 15. FIG. 5 is an enlarged cross-sectional view of a composite sandwich panel material 10 used to form the inventive cargo construct 50 according to embodiments of the invention. FIG. 5 shows further details of the various layers making up the composite sandwich panel material 10. In some embodiments, a cloth 19 is present intermediate between the face 17 of the open area core 12 and the surface sheet 14, the cloth 19 being embedded within the adhesive 20. The structural skin 16 is adhered to an opposing second side of the open area core 12 by a second adhesive layer 22. In some embodiments, a cloth 19' is present intermediate between the face 17' of open area core 12 and the structural skin 16, the cloth 19' being embedded within the adhesive 22.

According to embodiments, the open area core 12 is formed of a lightweight material that defines a plurality of pores 24 so as to reduce the overall density of the open area core 12. The open area core 12 is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, oraerogels, regardless of whether the foam is open-celled or closed-celled. The top edges of the walls 26 that define the pores 24 in certain embodiments of the open area core such as 12 form an array of various shapes, such as hexagonal, circular, rhomboidal, triangular, parallelogram quadrilateral, and regular quadrilateral, honeycombs, diamonds, squares, triangles, parallelograms, circles, or a combination thereof. In some embodiments, the ratio of the thickness of a wall 26 to the maximal linear extent between faces 17 and 17' is between 0.01-10:1. A wall thickness ranges from 0.1 mm to 100 mm in such embodiments.

The adhesive layers 20, 22 are formed of either a thermoplastic or curable formulation, a polyurethane or polyurethane prepolymer adhesive, which may be in the form of glue, a moisture cure adhesive, a reactive hot melt adhesive, or a polyurethane resin. As shown in FIG. 5, due to the compressive force applied to the adhesive layers 20, 22 between the surface sheet 14 and the open area core 12 and the structural skin 16 and the open area core 12, the adhesive 20, 22 is engineered to have an initial viscosity on contact with the face 17 and the walls 26 so as partially fill the pores 24 of the open area core 12. The viscosity of the adhesive layers 20, 22 ensures that the adhesive does not excessively run into the pores defined in the open area core before the adhesive attains final strength. Accordingly, the adhesive surface area for adhesion between a surface sheet and structural skin and the open area core is at least 5% more than surface area of the walls at the face. This increased surface area of adhesion reduces delamination of the components of the composite sandwich 10 and surprisingly allows for the use of thinner surface sheets that do not exhibit bond line read through. As a result of increasing the adhesive surface area coverage from 10 to 50 surface areas percent allows for the comparatively expensive high gloss surface sheet to be reduced in thickness from 1.5 mm to between 1.3 and 0.8 mm while still preventing of bond line read through.

The surface sheet 14 of the composite sandwich panel 10 is formed from sheet molding compound (SMC), thermoplastic, dicyclopentadiene (DCPD), overmolded polyurethane (PU), or a combination thereof. According to embodiments, the surface sheet 14 is a high gloss surface sheet having a high gloss surface 15. The surface sheet 14 can include a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 5 millimeters (mm) without regard to edges.

As will be understood by a person having ordinary skill in the art, the high gloss surface sheet tends to be a comparatively dense component and an expensive portion to manufacture given the materials used and necessary forming processes to maintain minimal perceptible surface defects suitable for a Class A autobody part. To reduce costs and weight of the composite sandwich panel material 10, it is accordingly desirable to reduce the thickness of the high gloss surface sheet 14, making it as thin as possible. It will also be understood that as the thickness of the high gloss surface sheet 14 is decreased the high gloss surface sheet 14 tends to deform when supported by limited portions of the face 17 above the open area core 12. While result to a large contact surface area of the first adhesive layer 20 is advantageous, in some inventive embodiments a cloth 19 is embedded in the first adhesive layer 20.

The structural skin 16 is adhered to the second side of the open area core 12 by the second adhesive layer 22. The structural skin 16 is formed of a fiber mat having non-oriented, non-woven fibers, unidirectional, or woven fibers, a thermoplastic sheet, or an SMC. The structural skin 16 provides a robust and durable surface. In some embodiments, the structural skin 16 terminates against the backside of the surface sheet 14 to encapsulate the open area core 12.

According to certain embodiments, the composite sandwich panel material 10 provides sound damping, fire retardancy, thermal insulation, or a combination thereof by placing a sound and/or heat absorbing material within the pores 24 of the open area core 12. According to embodiments, the pores 24 of the open area core 12 are at least partially filled with a fill 49. The fill illustratively including foam pellets, fire retardant, or a phase change material. Phase change materials operative herein include waxes or an inorganic salt hydrates.

The surface sheet 14 and the structural skin 16 are joined together along an edge 33A-33D of the composite sandwich panel material 10 to form a seal, as shown in FIGS. 6A-6D, respectively. In certain embodiments in which all of the edges of the composite sandwich panel assembly 10 are sealed, the open area core 12 is fully enclosed and moisture is inhibited from entering the interior of the composite sandwich panel assembly 10. Given that the components of the inventive cargo construct 50 formed of the composite sandwich panel assembly 10 are exposed to natural elements including sun, snow, humidity, and rain, preventing moisture from entering the interior of the composite sandwich panel material 10 is important given that freeze thaw cycles of moisture within the part cause expansion and potentially failure of the composite sandwich panel material 10, leading to damage to the vehicle cargo construct 50. Additionally, in embodiments in which the open area core 12 is formed of a hydrophilic material such as paper, moisture within the composite sandwich panel assembly 10 would destroy the open are core 12 and cause the part to fail.

FIGS. 6A-6D show various embodiments of ways in which the surface sheet 14 and the structural skin 16 are joined together to form a sealed edge 33A-33D, respectively according to the present disclosure. In some inventive embodiments an elastomeric gasket 34 is disposed between the surface sheet 14 and the structural skin 16 at the 33C to make the edge 33C more water resistant. It is appreciated that a gasket is readily included in the other edge joinder 33A, 33B, and 33D. The gasket 35 enhances maintenance of the edge seal over a wider range of use conditions.

As will be understood by one having ordinary skill in the art, to form an edge seal between the surface sheet 14 and the structural skin 16, at least one of the surface sheet 14 and the structural skin 16 requires enough material to wrap around the edge of the composite sandwich 10. According to embodiments, at least one of the surface sheet 14 and the structural skin 16 is provided in dimensions greater than the dimensions of the final composite part such that the material is able to wrap around the final edge composite sandwich 10. According to certain embodiments, the at least one of the surface sheet 14 and the structural skin 16 is preformed such that it has edges extending generally perpendicularly from the plane of the sheet material.

According to embodiments, excess material is cut from the composite sandwich once the edge seal is formed. As shown in FIG. 6A, excess material of the structural skin 16 has been trimmed from the composite sandwich assembly 10 by a knife or router that presses against the divot 35A that is formed by the surface sheet 14. In FIG. 6B, the edge 33B formed by removing excess material for tool engagement against a shoulder 35B of the surface sheet 14. In FIG. 6C, the edge 33C formed by removing excess material for tool engagement against a shoulder 35C of the surface sheet 14. Also, as shown in FIG. 6D, excess material of one or both the surface sheet 14 and the structural skin 16 are trimmed with tool pressure against shoulder 35D.

Figure 7:
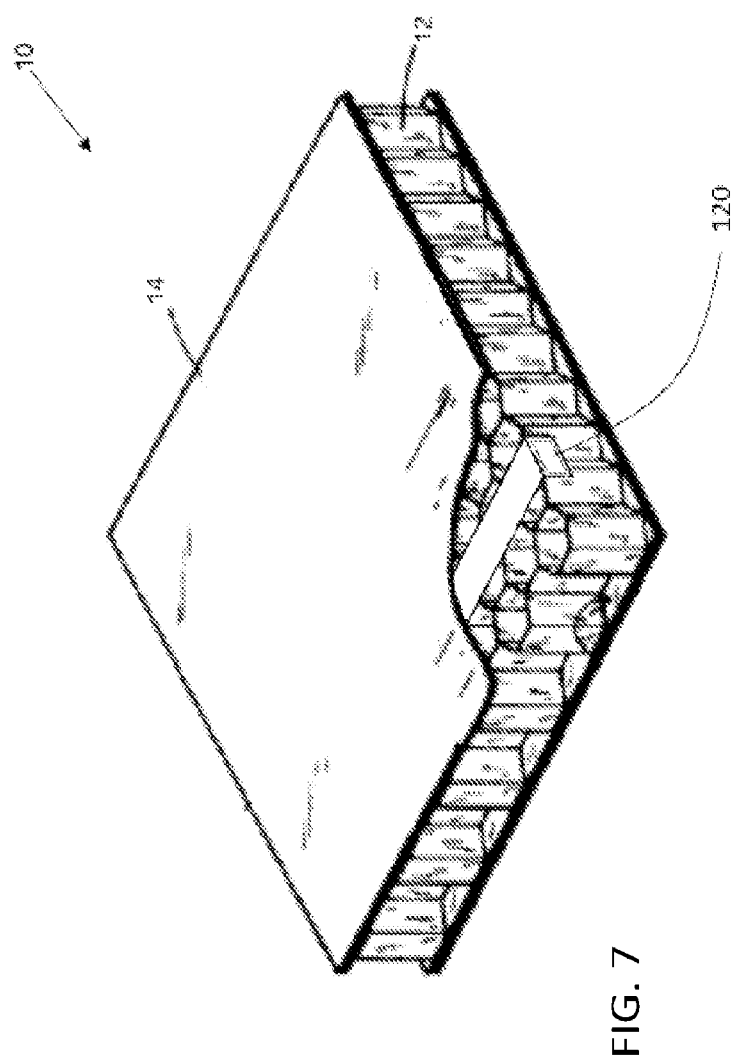
FIG. 7 is a partial cutaway, perspective view of a composite sandwich panel material having a conduit used to form embodiments of the inventive component construct.

As shown in FIG. 7, embodiments of an inventive vehicle cargo construct 50 include a conduit system 120 embedded within the composite sandwich panel material 10 of the vehicle component. As shown in FIG. 7, the conduit system 120 is embedded in the open area core 12 of composite sandwich panel assembly 10 that forms the vehicle cargo construct 50. According to embodiments, the conduit system 120 comprises tubing or wires that are molded into the open area core 12 of the composite sandwich 10 before the vehicle component is formed. According to embodiments, the conduit system 120 includes electrical wiring, ventilation ducts, or heating elements. Accordingly, embodiments of the inventive vehicle cargo construct 50 are capable of including features such as speakers, lights, air vents, and defrosting elements for removing ice or snow present on the vehicle cargo construct 50. The conduit systems 120 of various vehicle components are configured to align with one another to form a single connected conduit system throughout the vehicle to connect electrical wiring, ventilation ducts, and/or heating elements of each of an inventive vehicle cargo construct with like electrical wiring, ventilation ducts, and/or heating elements of the vehicle to function.

According to embodiments, the floor 52, the side wall panels 58, and the end wall panel 64 of the vehicle cargo construct 50 are integrally formed of a single piece of composite sandwich panel material 10 or each piece is formed of a separate piece of composite sandwich panel material 10. Accordingly, the vehicle cargo construct 50 is a single unitary construct that is configured to be attached to a vehicle frame according to some embodiments. Alternatively, the vehicle cargo construct 50 is formed a several separate pieces that are configured to be joined together and to a vehicle frame. In instances in which the vehicle cargo construct 50 is formed of a single piece of composite sandwich panel material 10, the cargo construct 50 is formed by folding the side walls 58 and the end wall 64 up from the plane of the floor 54. According to embodiments, the folding includes crushing portions of the composite sandwich panel material 10, particularly the open area core 12 along the fold lines.

Figure 8:
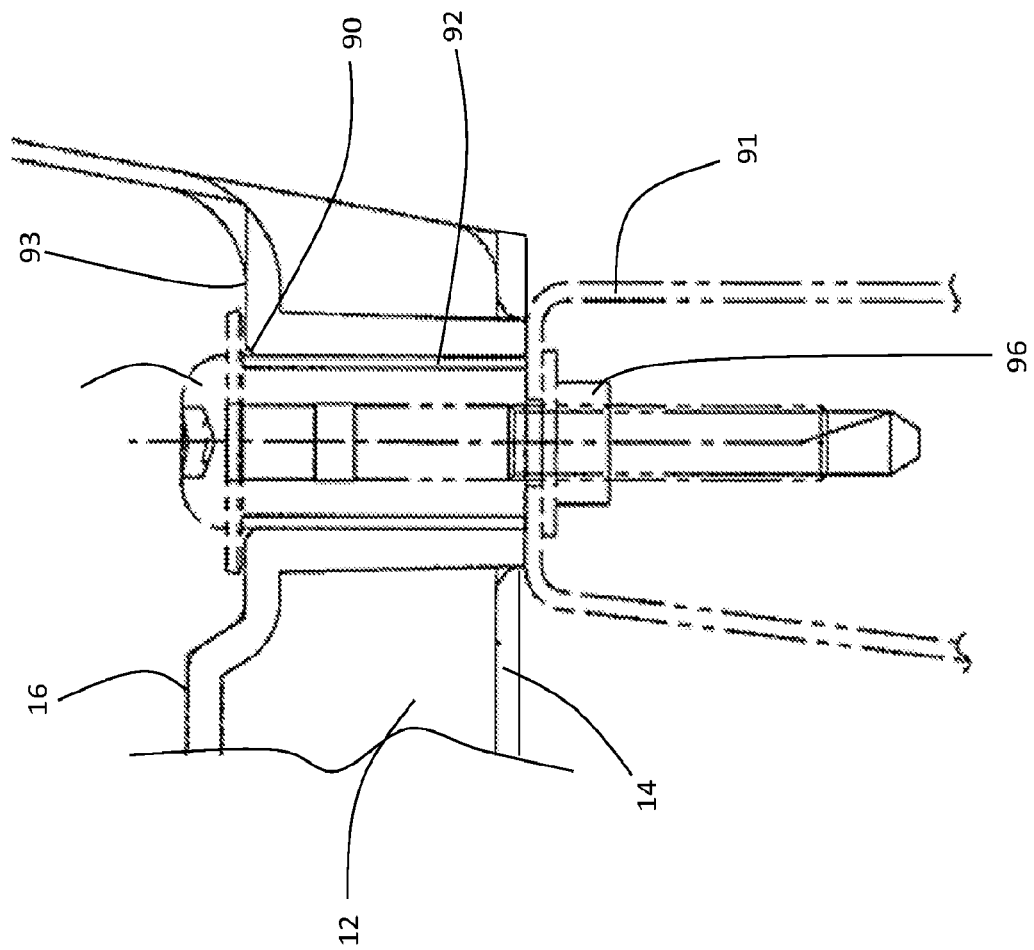
FIG. 8 is a cross sectional view of a hard point at which a vehicle cargo construct is attached to a vehicle frame or chassis according to embodiments of the present disclosure.

According to embodiments, the floor 52, the side wall panels 58, and/or the end wall panel 64 of the vehicle cargo construct 50 include a plurality of hard points 90, as shown in FIG. 8. The hard points 90 are configured to be points at which the vehicle cargo construct 50 is attached to the vehicle frame or chassis 91. According to embodiments, the hard points 90 are through holes defined in the composite sandwich panel material 10 that forms the vehicle cargo construct 50. According to embodiments, a fastener, such as a bolt 94, is inserted through the hard point 90 and through an opening defined in the vehicle frame 91, securing the vehicle cargo construct 50 to the vehicle frame 91 using a nut 96. According to embodiments, the hard points 90 are formed in mounting recesses 93 that are formed in the structural skin surface of the composite sandwich panel material 10, thus allowing the head of the fastener 94 to be recesses into the mounting recess 93 so that the head of the fastener 94 is flush with the surface of the cargo compartment that is defined by the structural skin 16 of the composite sandwich panel material 10. According to embodiments, the hard points 90 include a collar 92 disposed within the through hole that forms the hard point 90. The collar 92 may be inserted into the through hole defined by the composite sandwich panel material 10 after the through hole is formed in the composite sandwich panel material 10 or the collar 92 may be pre-positioned and the composite sandwich panel material 10 formed around the collars 92.

According to embodiments, the lower surface 56 of the floor 52 is defined by the surface sheet 14 of the composite sandwich panel material 10 and the oppositely opposed upper surface 54 of said floor 52 is defined by the structural skin 16 of the composite sandwich panel material 10. According to embodiments, the exterior surface 60 of each of the side wall panels 58 is defined by the surface sheet 14 of the composite sandwich panel material 10 and the oppositely opposed interior surface 62 of each of the side wall panels 58 is defined by the structural skin 16 of the composite sandwich panel material 10. According to embodiments, the exterior surface 66 of the end wall panel 64 is defined by the surface sheet 14 of the composite sandwich panel material 10 and the oppositely opposed interior surface 68 of the end wall panel 64 is defined by the structural skin 16 of the composite sandwich panel material 10. As noted above, in embodiments surface sheet 14 of the composite sandwich panel material 10 is a high gloss surface sheet with a high gloss finish 15 with minimal perceptible surface defects suitable for a Class A autobody part. Accordingly, in some embodiments the exterior surface 60 of each of the side wall panels 58 is a high gloss surface sheet 14.

According to embodiments, the upper surface 54 of the floor 52, the interior surface 62 of each of the side walls 58, and the interior surface 68 of the end wall 64 define a cargo compartment within the vehicle cargo construct 50. Given that these surfaces are defined by the structural skin 16 of the composite sandwich panel 10, these surfaces that define the cargo compartment are high strength, robust, and resistant to scratches, punctures, and other damage.

According to embodiments, the vehicle cargo construct 50 additionally includes a second end wall panel 70 extending from the floor 52 between the side wall panels 58. According to embodiments the second end wall panel 70 is formed a separate piece of the composite sandwich panel 10. The second end wall panel 70 has an exterior surface 72 and an oppositely opposed interior surface 74. According to embodiments, the exterior surface 72 of the second end wall panel 70 is defined by the surface sheet 14 of the composite sandwich panel material 10 and the oppositely opposed interior surface 74 of the second end wall panel 70 is defined by the structural skin 16 of the composite sandwich panel material 10. According to embodiments, the surface sheet 14 has a high gloss surface 15, thus the exterior surface 72 of the second end wall panel 70 has a finish that is suitable for a vehicle exterior. According to embodiments, the second end wall panel 70 is a tailgate attached to the floor 52 by a hinge. Thus, the second end wall panel 70 is configured to pivot about the hinge to open and close the end of the containment construct 50, thereby allowing a user access to the cargo compartment within the vehicle cargo construct 50 when the tailgate 70 is in its open position, and enclosing the cargo compartment within the vehicle cargo construct 50 when the tailgate 70 is in its closed position.

According to embodiments, any of the side wall panels 58 and/or the end wall panels, 64, 70 are formed of a double wall of composite sandwich panel material 10. In such embodiments, a void may be formed between the two walls of composite sandwich panel material 10. Within such a void, at least one compartment for housing various items is formed. The compartment may have a locking door formed in either one or both of the surrounding walls of composite sandwich panel material 10. Accordingly, items such as tools may be securely stored within the vehicle cargo construct 50.

According to embodiments, the vehicle cargo construct 50 additionally includes a plurality of wheel wells 76 each having an interior surface 78 and an exterior surface 80. Each of the wheel wells 76 configured to receive a wheel of the vehicle on the side of the exterior surface 80 of the wheel well 76 and partially surround the wheel of the vehicle. According to embodiments, the plurality of wheel wells 76 are defined by and are integrally formed with each of the side wall panels 58. Alternatively, the wheel wells 76 are structures formed separately from the side wall panels 58. Each of the wheel wells 76 is positioned between one of the side wall panels 58 and the floor 52.

According to embodiments, the vehicle cargo construct 50 additionally includes a plurality of cap sections 82 positioned along an upper edge of any or all of the side wall panels 58, the end wall panel 64, and the second end wall panel 70. According to embodiments, the cap sections 82 are formed of the composite sandwich panel material 10. The cap section 82 may be integrally formed with the panel from which it extends or may be formed of a separate piece of composite sandwich material 10 that is then attached to the corresponding panel to form the vehicle cargo construct 50.

According to embodiments, the vehicle cargo construct 50 additionally includes a plurality of shoulders 83. The shoulders 83 are configured to join and/or cover the corner edges of the wall sections 58, 64. The shoulders 83 may be positioned within the cargo construct or may be on the exterior side of the cargo construct 50. According to embodiments, the vehicle cargo construct 50 additionally includes a c-shaped outer frame positioned along the edges of the floor 52 and walls 58, 64. The c-shaped outer frame provides increased rigidity at the edges to further strengthen the cargo construct 50.

As shown in FIG. 3, embodiments of the vehicle cargo construct 50 include a bed liner 84 positioned on the upper surface 54 of the floor 52 of the containment construct 50. According to embodiments, the bed liner 50 is formed of the composite sandwich panel material 10. According to embodiments, the bed liner 84 is removable from the cargo construct 50 such that the bed liner 84 may be removed, easily washed, or replaced.

According to embodiments, the vehicle cargo construct 50 includes a plurality of break lines 88 or corrugations formed in the floor 52, the side wall panels 58, the end wall panels 64, 70, the cap sections 82, the be liner 84, the wheel wells 76, or a combination thereof. Such break lines 88 provide a predetermined crumple path in the event of an impact so that the composite sandwich panel material 10 of each part crumples and absorbs impact energy. According to embodiments, the break lines 88 are formed by crushing the open area core 12 of the composite sandwich panel material 10 in pre-determined locations.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A vehicle cargo construct comprising:
   a floor having an upper surface and an oppositely opposed lower surface, the floor having a plurality of corrugations formed therein;
   a plurality of side wall panels extending from said floor, each of said plurality of side wall panels having an exterior surface and an oppositely opposed interior surface; and
   an end wall panel extending from said floor between said plurality of side wall panels, said end wall panel having an exterior surface and an oppositely opposed interior surface;
   each of said floor, said plurality of side wall panels, and said end wall panel being integrally formed of a single piece of composite sandwich panel material comprising an open area core defining a plurality of pores, a surface sheet adhered to a first face of the open area core by a first adhesive layer, and a structural skin adhered to a second face of the open area core by a second adhesive layer;
   wherein said plurality of side wall panels, and said end wall panel are each folded up from a plane of said floor along a plurality of fold lines, said open area core being crushed along the plurality of fold lines.

2. The vehicle cargo construct of claim 1 wherein the lower surface of said floor is defined by the surface sheet of said composite sandwich panel material and the oppositely opposed upper surface of said floor is defined by the structural skin of said composite sandwich panel material.

3. The vehicle cargo construct of claim 1 wherein the exterior surface of each of said plurality of side wall panels is defined by the surface sheet of said composite sandwich panel material and the oppositely opposed interior surface of each of said plurality of side wall panels is defined by the structural skin of said composite sandwich panel material.

4. The vehicle cargo construct of claim 1 wherein the exterior surface of said end wall panel is defined by the surface sheet of said composite sandwich panel material and the oppositely opposed interior surface of said end wall panel is defined by the structural skin of said composite sandwich panel material.

5. The vehicle cargo construct of claim 1 further comprising a second end wall panel extending from said floor between said plurality of side wall panels, said second end wall panel having an exterior surface and an oppositely opposed interior surface.

6. The vehicle cargo construct of claim 1 further comprising a plurality of cap sections positioned along an upper edge of each of said plurality of side wall panels and said end wall panel.

7. The vehicle cargo construct of claim 1 further comprising a bed liner positioned on the upper surface of said floor.

8. The vehicle cargo construct of claim 1 wherein the open area core of said composite sandwich panel material is an array having a pattern of at least one shape of: hexagonal, circular, rhomboidal, triangular, parallelogram quadrilateral, or regular quadrilateral.

9. The vehicle cargo construct of claim 1 wherein the open area core of said composite sandwich panel material is formed of at least one of: cellulosics, thermoplastic, thermoset, metal, or foam.

10. The vehicle cargo construct of claim 1 wherein the surface sheet of said composite sandwich panel material is formed of any one of: sheet molding compound (SMC), thermoplastic sheet, dicyclopentadiene (DCPD), or overmolded polyurethane (PU).

11. The vehicle cargo construct of claim 1 wherein the surface sheet includes a filler of at least one of: glass fiber, carbon fiber, carbon nanotubes, graphene, inorganic particulate fillers, glass microspheres, low profile additives, or moisture scavengers.

12. The vehicle cargo construct of claim 1 wherein the surface sheet of said composite sandwich panel material has a thickness of from 0.5 to 3.5 mm.

13. The vehicle cargo construct of claim 1 wherein said composite sandwich panel material has a cloth intermediate between the surface sheet and the open area core.

14. The vehicle cargo construct of claim 13 wherein the cloth is embedded in the first adhesive layer and the surface sheet is an SMC that has a thickness of less than 1.5 mm and still has a high gloss surface.

15. The vehicle cargo construct of claim 1 wherein the first adhesive layer of said composite sandwich panel material contacts an interior volume of the open area core.

16. The vehicle cargo construct of claim 1 wherein the structural skin is formed of a fiber mat.

17. The vehicle cargo construct of claim 16 wherein the second adhesive layer of said composite sandwich panel material impregnates the fiber mat.

18. The vehicle cargo construct of claim 1 wherein said composite sandwich panel material has a fill in the pores of the open area core, the fill being at least one of a sound dampening foam, a fire retardant, or a phase change material.

19. The vehicle cargo construct of claim 1 wherein the surface sheet of said composite sandwich panel material and the structural skin of said composite sandwich panel material are joined together to form an edge defining a moisture resistant seal.

* * * * *